April 3, 1956

H. L. HILTON 2,740,922

ELECTRIC METER SOCKET

Filed Nov. 8, 1954

INVENTOR.
H. L. Hilton
BY Kenneth M. Thorpe
Atty.

United States Patent Office 2,740,922
Patented Apr. 3, 1956

2,740,922
ELECTRIC METER SOCKET
Harrison L. Hilton, Orlando, Fla.
Application November 8, 1954, Serial No. 467,468
1 Claim. (Cl. 317—107)

This invention relates to sockets for electric meters having terminals of the plug-in type to removably receive male elements projecting from the rear of the light meter. In installations of this type it has been found desirable to provide the meter and the socket box with means for automatically providing a high resistance path from the lead-in side of the meter to the grounded shell of the box or meter socket. This provides protection for the meter from excessive voltage surges due to static build-up on the line or lightning.

The chief object of the invention is to provide simple and fool-proof means, entirely independent of the construction of the meter, whereby the mere plugging in of the meter insures that there is a path for diverting excessive voltage surges to the shell of the box which is grounded. The electrician when installing or removing a meter does not have to connect or disconnect any leads.

A further object of the invention is to provide an arcing gap which can be easily installed on existing meter sockets without any radical or extensive modifications.

With the general objects named in view and others as will hereinafter appear, the invention consists in certain new and useful features of construction and organization of parts as hereinafter described and claimed; and in order that it may be fully understood, reference is to be had to the accompanying drawing, in which:

Figure 1:
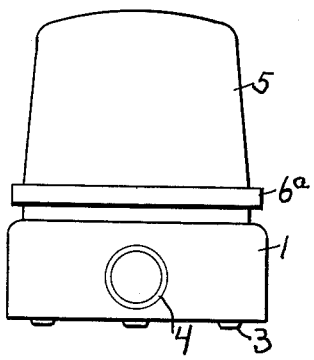
Figure 1 is a side elevation of a meter socket and meter embodying the invention.
Figure 2:
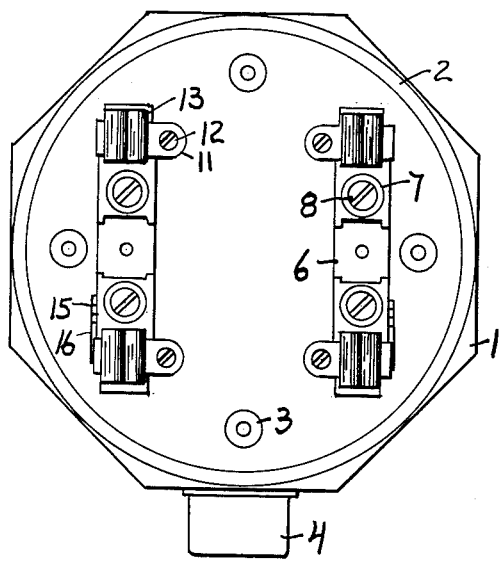
Figure 2 is an enlarged view of the meter socket with the meter removed.

In the said drawing, where like reference characters identify corresponding parts in all of the figures, 1 is the shell of a meter socket or box, which may be drawn to hexagonal shape if desired, and, at its open side, is formed with a circular sealing flange 2. The bottom or closed side of the meter socket is formed with perforated outwardly facing spacing bosses 3 which hold the box away from the wall or surface to which it is attached. This spacing largely prevents entrapment of moisture and also accommodates the ends of certain machine screws hereinafter identified.

The side faces of the box or meter socket are formed with one or more hubs 4, through which leads from and to the meter extend, as common in devices of this kind. Adapted to have a weather-tight seat on the flange 2 is an electric meter 5 which is held in position in the construction illustrated by any suitable type of clamp ring 6a. It is to be understood that the underside of the meter is provided with the necessary male contacts (not shown) for frictional engagement with the female socket contacts hereinafter identified.

Figure 3:
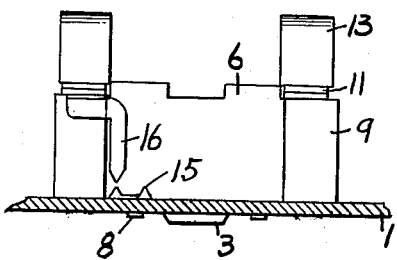
Figure 3 is a fragmental side view of one face of an insulating block showing the arcing gap of the invention.
Figure 4:
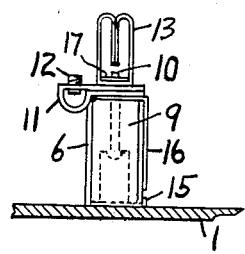
Figure 4 is an end view of the device as shown in Figure 3.

Secured within the socket are insulating blocks 6 which are held in position by being formed with counterbored holes 7 receiving securing screws 8. The ends of the screws 8 are tapped through the metal of the bottom of the box as shown in Figure 3. The ends of the insulating blocks 6 may be reduced as at 9. Extending up through counterbored holes in the blocks 6 are screws 10 which pass through terminal straps 11 bent to form wire-receiving loops and being equipped with wire clamping set screws 12. Overlying the terminal straps 11 are upstanding female spring clips 13 which frictionally receive the male meter terminals, not shown.

Underneath the terminal blocks 6 at their lead-in ends, are metal straps 15 in contact with the grounded metal box 1, said straps having leakage discharge points facing upward toward cooperating downwardly extending discharge straps 16 which are bent over the terminal straps 11. The whole assembly, a described, is held in position by nuts 17 threaded on the screws 10, so that the parts are clamped in good current conducting contact. As illustrated herein, each of the terminal blocks 6 is provided with the arcing points so that excessive voltage surge on either side of the line will be provided with an arcing discharge path, and the meter will be protected against damage.

From the above description and drawing, it will be apparent that I have produced a device embodying all of the features of advantage set forth as desirable; and while I have described and illustrated the preferred embodiment, it is to be understood that I reserve the right to all changes within the spirit and scope of the appended claim.

I claim:

The combination of an electrical conducting grounded meter socket, of an insulating block secured in said socket, a right angle conducting strap having one end inserted between the block and socket and in electrical conducting contact with the latter and its other leg paralleling a side face of the insulating block, an electrical terminal carried by the upper end of the block, and a right angle conducting strap inserted between said terminal and block and in electrical conducting contact with the former and its other leg paralleling the same side face of the block as the first-named strap, said straps being in axial alinement and terminating in spaced relation.

References Cited in the file of this patent
UNITED STATES PATENTS

| | | |
|---|---|---|
| 1,766,665 | Merkel | June 24, 1930 |
| 2,199,630 | Hodnette | May 7, 1940 |
| 2,338,109 | Green | Jan. 4, 1944 |